United States Patent [19]

Filby et al.

[11] Patent Number: 5,025,391

[45] Date of Patent: Jun. 18, 1991

[54] EXPERT OVERSEER FOR MASS SPECTROMETER SYSTEM

[75] Inventors: Evan E. Filby, Idaho Falls; Richard A. Rankin, Ammon, both of Id.

[73] Assignee: The United States of America as represented by the United States Department of Energy, Washington, D.C.

[21] Appl. No.: 333,075

[22] Filed: Apr. 4, 1989

[51] Int. Cl.$^5$ .............................................. G06F 15/18
[52] U.S. Cl. .................................... 364/513; 364/579
[58] Field of Search ............................... 364/513, 579

[56] References Cited

PUBLICATIONS

Diagnostic Aid for Mass Spectrometer Trouble-Shooting; Filby et al; Proceedings of the American Nuclear Society Topical Meeting on Artificial Intelligence and Other Innovative Computer Applications; Aug. 31—Sep. 2, 1987; Snowbird, Utah.

Application of Knowledge Based Systems Technology to Triple Quadrupole Mass Spectrometry (TQMS); Brand et al; National Conference on Artificial Intelligence; Philadelphia, Pa.; Aug. 1986.

Application of Expert Systems Technology to Triple Quadrupole Mass Spectrometry (TQMS); Brand et al; International Joint Conference on Artificial Intelligence; Aug. 1985.

Primary Examiner—Allen R. MacDonald
Attorney, Agent, or Firm—Bradley W. Smith; John M. Albrecht; William R. Moser

[57] ABSTRACT

An expert overseer for the operation and real-time management of a mass spectrometer and associated laboratory equipment. The overseer is a computer-based expert diagnostic system implemented on a computer separate from the dedicated computer used to control the mass spectrometer and produce the analysis results. An interface links the overseer to components of the mass spectrometer, components of the laboratory support system, and the dedicated control computer. Periodically, the overseer polls these devices and as well as itself. These data are fed into an expert portion of the system for real-time evaluation. A knowledge base used for the evaluation includes both heuristic rules and precise operation parameters. The overseer also compares current readings to a long-term database to detect any developing trends using a combination of statistical and heuristic rules to evaluate the results. The overseer has the capability to alert lab personnel whenever questionable readings or trends are observed and provide a background review of the problem and suggest root causes and potential solutions, or appropriate additional tests that could be performed. The overseer can change the sequence or frequency of the polling to respond to an observation in the current data.

23 Claims, 11 Drawing Sheets

EXPERT OVERSEER FOR MASS SPECTROMETER SYSTEM

CONTRACTUAL ORIGIN OF THE INVENTION

The United States Government has rights in this invention pursuant to Contract No. DE-AC07-84-ID-12435 between the United States Department of Energy and Westinghouse Idaho Nuclear Company, Inc.

BACKGROUND OF THE INVENTION

A mass spectrometer is a highly complex array of components. These components include an extensive ultra high vacuum system, composed of stainless steel housings, precision-fit flanges and gaskets, high performance valves, and a variety of ultra high vacuum pumps and gauges. Magnetic-sector type instruments require one or more high-quality magnets with precise controllers. Solids units use thermal ionization sources, requiring multiple power supplies and controls to produce sample ions and focus them into a path through the magnetic field. Other specialized components collect and measure the ions. This requires additional precision equipment, including systems that can accurately and reproducibly measure extremely small electrical currents. The ultra high vacuum, magnet, source, and collector units all require monitoring and control electronics.

An electronic interface is required between the analog hardware of the instrument and the computer dedicated to analyzing samples. The computer adds yet another set of hardware components, such as power supplies, memory, a central processor, as well as the interfaces with the computer peripherals such as the printer, console, and mass memory. Finally, system software and applications programs must be provided to issue commands to operate the instrument hardware.

All of these components must be working properly to provide timely, high quality data. But because of the wide range of integrated components, root causes for problems on a mass spectrometer can be difficult to diagnose. Locating the weak link can be an intricate and time-consuming effort. Moreover, a single problem may impact several individual subsystems. Also, minor weaknesses in several subunits that would not cause a failure individually could combine synergistically to create a problem.

Prior practice in mass spectrometry has included two basic strategies for handling instrument problems. Examples of prior practice are exemplified by "Incos 2000 Series Data Systems for Mass Spectrometry," by the Finnigan Corporation and "Application of Artificial Intelligence to Triple Quadrupole Mass Spectrometer," by C. M. Wong, et al, *IEEE Transactions on Nuclear Science*, Vol. NS-31 (Feb. 1984). The most common practice is to wait until a component has clearly failed, and then perform tests to identify the root cause or causes. More experienced practitioners might be able to discern less obvious symptoms and thereby predict some failures, but this is neither common nor all-encompassing. In some cases, computerized test protocols may be available to the diagnostician, and he may be able to recall component status information from electronic storage. The second basic strategy employs pre-set status conditions to alert the operator to developing problems. Violations of these set points can either signal a warning, or shut the system down. These strategies have several deficiencies. Obviously, a component failure is detected most often during an actual analysis. This not only costs the time involved in that analysis, it also causes delays in providing results for the sample. Once the failure has occurred, more time will be lost while tests are run and diagnostic information is collected. The practitioner then needs to evaluate the results, perhaps perform more tests, and then devise a repair plan. If the practitioner is not fully qualified to handle certain problems, additional experts may need to be consulted.

Not only time is lost but running a component to failure may cause damage that could have been avoided by an earlier shutdown. For example, if a typical ultra-high vacuum diffusion pump ran for several hours at 0.050 Torr, it could be severely damaged and might well be destroyed. Yet operation at 0.003 Torr would bake the unit but probably cause no permanent harm. This is, in fact, a major part of the rationale behind the set-point shutdown strategy.

Unfortunately, the latter approach tends to be quite inflexible. It will ignore almost-critical values, yet flag a high reading that lasts only a fleeting moment. Delay circuits may be used to screen out some transients, but these are usually set quite conservatively to avoid potentially damaging conditions. This conservatism tends to cause false alarms and unjustified shutdowns. Also, such a system cannot evaluate situations where a combination of minor instabilities may predict a major problem. Finally, even a valid shutdown done too abruptly might impact other parts of the instrument.

Therefore, it is an object of this invention to combine elements of real-time instrument automation, set-point damage prevention, and expert system technology to monitor the operation of a mass spectrometer.

A further object of this invention is to collect real-time status data for all key instrument components, evaluate the results using a rule base of expert knowledge, and alert the operator to developing problems.

A still further object of this invention is to immediately provide an up-to-date chronology of the status information and suggest additional diagnostic tests when a major problem to the system is detected.

It is a further object of this invention that during a troubleshooting session, the system would employ the knowledge of several experts, not just one person.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The expert overseer provides for the operation and real-time management of a mass spectrometer and associated laboratory equipment. The overseer is a computer-based expert diagnostic system implemented on a computer separate from the dedicated computer used to control the mass spectrometer and produce the analysis results. An interface links the overseer to components of the mass spectrometer, components of the laboratory support system, and the dedicated computer. Periodically, the overseer polls the components of the mass spectrometer and the laboratory system as well as itself.

Data obtained during this polling are evaluated in real-time by the expert portion of the overseer system. A knowledge base used for the evaluation includes both heuristic rules and precise operational parameters. The overseer also compares current readings to a long-term database to detect developing trends using a combination of statistical and heuristic rules. The overseer has the capability to alert lab personnel whenever questionable readings or trends are observed and provide a background review of the problem and suggest root causes and potential solutions, or appropriate additional tests that could be performed. The overseer can change the sequence or frequency of the polling to respond to an observation in the current data.

DETAILED DESCRIPTION OF THE INVENTION

The present invention will be described in detail as used with a mass spectroscopy system. The present invention, which is a system within itself, can be applied to any complex instrument system and is not intended to be considered to apply solely to a mass spectrometer system. Examples of other complex systems to which the present invention can be applied include: nuclear magnetic resonance (NMR) instruments and surface analysis instruments, such as electron microprobe, LAMMA, ESCA/Auger, and others.

The present invention, the expert overseer, combines mass spectrometric interface hardware, quantitative set-point protocls, qualitative norms defining proper instrument conditions, and expert system technology to detect developing problems in real time, automatically respond with adaptive diagnostic procedures, and guide a human operator during a trouble-shooting session. First, the use of an expert system with a flexible rule base allows the pre-set limits on parameters such as the vacuum levels to be established as time-dependent ranges so that degrees of deviation can be accommodated. Second, the actual status sampling protocol used by the expert overseer can change dynamically to collect more frequent data from a unit if an instability appears. Third, the response to a problem can be intelligently gauged to provide a controlled shutdown allowing a current operation to continue to a safer or more sensible stopping point. Fourth, the output from the overseer immediately provides a human operator with a review of how the problem developed or is developing. Fifth, the expert overseer provides a troubleshooting guide for additional tests and instructions for any repairs needed.

Figure 1:
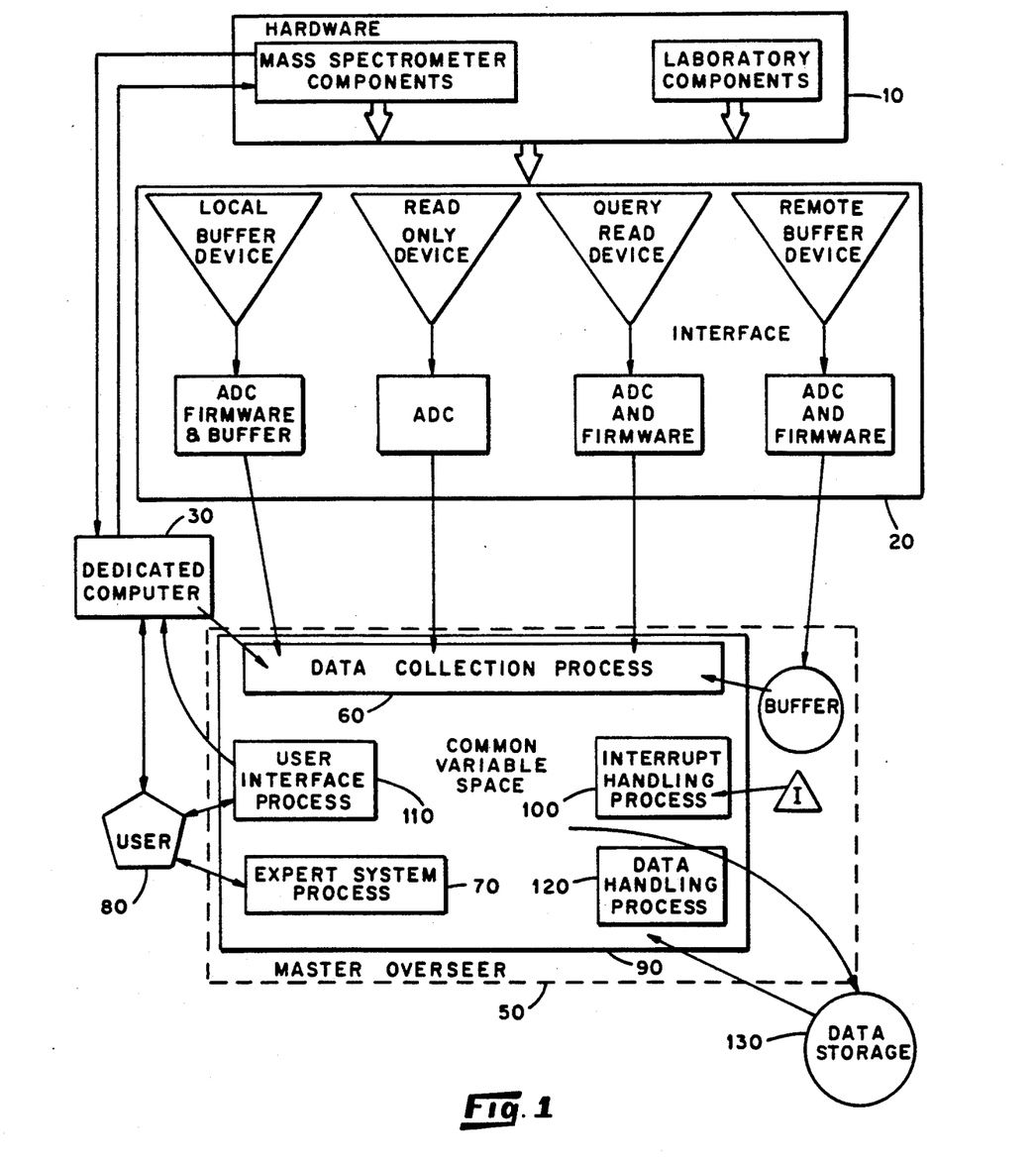
FIG. 1 is a flow chart depicting the conceptual structure of the present invention in the mass spectrometer environment.

FIG. 1 shows the conceptual structure of the system. The hardware components 10 include the mass spectrometer (including the various components that make up the mass spectrometer) as well as other laboratory components. Hardware components 10 may include vacuum gauge controllers, temperature probes, power supply monitors, cooling water flow meters, and other key components. A control computer 30 is linked to the mass spectrometer hardware components 10 and provides a control system for the operation of the mass spectrometer and may also include programs for the analysis of the results of experiments conducted on the mass spectrometer. The hardware components 10 are linked to a overseer through an interface 20 that may include various custom designed combinations of analog-to-digital conversion hardware, microprocessor firmware, and computer memory to buffer in-coming information. The data bus structure employed for each hardware component can be optimized for the kind of signal to be generated and read. In addition, the control computer 30 provides status information concerning the instruments into the overseer. The devices included in the hardware components 10 or the control computer 30 may send a real-time interrupt signal. Software for the overseer can be implemented in a multi-tasking environment to provide the real-time surveillance.

The master process 50 (represented by the dotted line box) of the overseer initiates the parallel sub-processes. The polling/data collection process 60 requests data from the hardware components 10 and the control computer 30 in the order established by the initial conditions or according to any new polling sequence set by the expert system process 70 or user/operator 80. That order is contained in the set of polling intervals. Critical devices are polled at relatively short intervals (30 seconds to 5 minutes), while others take data only upon demand (their intervals are set to very large numbers). The collected data are then written into the common variable space memory 90.

The interrupt handling process 100 supports the data collection process 60 in three ways. First, it traps the timing signal from a system clock to set a software flag that tells the data collection process 60 to request new data from the next device in the polling sequence. Second, it converts real-time hardware interrupts (shown by the "I" triangle within the dotted box) into software flags to prompt the data collection process 60 to request complete data from the device that sent the interrupt. Third, it sets a flag to signal instructions from the expert system process 70 and, indirectly, the user interface 110. All of these flags are passed through the common variable space 90.

The data handling process 120 regularly transfers new data for the devices from the common variable space 90 to external mass memory 130. Use of this separate process allows the polling/data collection process 60 to continue its polling sequence without becoming excessively disk-bound. The data handling process 120 also sets a software status flag to tell the expert system process 70 when new data has been collected and stored.

The expert system process 70 is at the core of the expert overseer. Whenever new data is obtained, this process checks key components in the current and historical database against its knowledge base of equipment set-points, allowed ranges, and parametric and heuristic rules. Where appropriate, it runs trends lines or other statistical tests to highlight possibly significant conditions. The rule base and inference engine of the expert system process 70 define when a set of findings are significant, as illustrated in the example below. (Brackets contain variables.)

IF [Source Vacuum] is between [0.00001 and 0.00005 Torr]
    AND [Source Vacuum] changed by more than [7%]
    AND [Filament Temperature] equals [2000 degrees]
    AND [Filament Temperature] changed by less than [20 degrees]
    THEN [Source Vacuum] equals [increasing too much] <Probability=65%>

The probability assignment indicates that there is a reasonable chance that the increase in the vacuum level into a pre-defined danger zone is too much to be explained by the small rise in temperature. Unlike conventional programs, the expert system can use this information to modify the behavior of the overseer system.

IF [Source Vacuum] equals [increasing too much]
    AND [Probability] is greater than [60%]
    AND [Source Vacuum Poll Interval] equals [10 minutes]
    THEN [Source Vacuum Poll Interval] equals [2 minutes]

In response to the potential problem, the expert system process 70 will set a flag and generate a related instruction record. These are passed through the common variable space 90 to the data collection process 60, which will then begin to take data for the source vacuum more frequently. This, in turn, will allow the expert system process 70 to watch the trend more closely.

Some situations may also need to be brought to the attention of the user/operator 80. The expert system process 70 generates a response flag and information record in the common variable space 90 to handle these cases. Response flags are read by the user interface process 110 and precipitate the activities defined in the related record. For example, suppose the pressure increase was 10% and the probability that it was "increasing too much" was now 86%. Another rule might read     IF [Probability] is [over 80%]
    THEN [Response flag/record] equals [Source Vacuum]

The user interface process 110 would read the record, display and print a message, and perhaps send a notice for display on the dedicated computer 30. The message in the situation above might read     The source vacuum has increased by 10% in 10 minutes into a potential danger zone between 0.00001 and 0.00005 Torr. Because the filament temperature has increased by less than 20 degrees to 1976, the level may be (probability 86%) increasing too much. The polling interval has been changed to 2 minutes.

At times, the inference engine may need additional data not provided by the various internal sources. This should invoke a call to the direct user interface 110 of the system. This invocation would be brought to the attention of the user/operator 80 by a response flag. Suppose the conditional side of the critical rule read     IF [Source Vacuum] is between [0.00001 and 0.00005 Torr] ( ... as above ... ) AND [Sample Volatility] equals [UNKNOWN] To obtain a value for the UNKNOWN property, the expert system process 70 could generate the response message below.

An uncertain situation has developed concerning the source. The expert system needs data on the sample volatility. Enter a "Y" if you can provide this information when asked by the expert system interface.

The purpose of this open-ended approach is to avoid hanging the system while it waits for input from the user/operator 80. Once the response flag and message have been placed in common variable space 90, the expert system process 70 can continue with its other checks. If the user/operator 80 is busy or does not know the answer, he can ignore the message.

The inference engine can also learn from a lack of response from the user/operator 80. For example, if the system reached the same stage after having asked for a response, it might now invoke the following rule.

IF [Sample Volatility] equals [UNKNOWN] AND [Past Query] equals [Sample Volatility] AND [User Input] equals [None]
    THEN [Sample Volatility] is assumed [Moderate]

The inference chain could then act despite the uncertainty. In our example the conclusion might be unchanged, but the probability should decrease.

THEN [Source Vacuum] equals [increasing too much] <Probability=55%>

Because this is below the threshold value used in the interval-change rule, no further actions would occur.

If the user/operator 80 did provide the information, the user interface process 110 would generate a flag for the expert system process 70. The expert system process 70 would examine the input from the common variable space 90, branch into the inference area, and ask for the information. Note that this sequence does have the potential for freezing the expert system process 70 while it waits for the entry; however, this would not adversely impact concurrent processes.

An alert situation would provide a more drastic action record than the response mode, possibly including audible or visual alarms and a forced shutdown sequence. Not only would the alert provide this immediate output, the system would continue by printing the recent historical record for each key variable, with pertinent diagnostic commentary. Where appropriate, the expert would provide guidance on additional tests that could be performed, and repair scenarios. This information would normally be printed by the user interface process 110, although some interactions could be handled within the expert system process 70.

The user interface 110 also allows the user/operator 80 to ask for further information, or provide instructions. Either entry would be transmitted back to the expert system process 70 via a user flag and information record. Standard requests for more information would be handled by rules built into the knowledge base, while a non-standard situation would generally activate direct user interaction with the query and inference mechanism of the expert system.

The simplest command allowed by the user interface stops all of the processes, including the master program 50. The user/operator 80 can also send a query to the inference engine of the expert system process 70, activating its direct user interface.

The remaining instructions affect the device polling sequence. The user/operator 80 can require the data collection process 60 to immediately poll a single device, or a pre-defined set. This does not change the polling intervals, so the subsequent polling order is the same. The user/operator 80 can also define changes in the polling intervals themselves. Unless all the values are changed proportionately, this will probably change the polling order. The new intervals will remain in effect until the program is reset or additional changes are invoked. Note that similar commands can also be passed to the data collection process 60 by the expert system process 70.

The master program 50 for the expert overseer would probably be restarted once a week. During restarting, the laboratory supervisor could make modifications to the device file and rule base, and move the historical data to archival storage (a summary would be retained in the data file of the overseer). The expert overseer would know it had just restarted and might have rules to invoke a special polling protocol. It could have protocols for scheduled checks (weekly, daily, once per shift), and for situational updates (sample probe insertion, analysis completion, severe environmental change).

As mentioned above, it is the preferred embodiment to implement the expert overseer on a computer separate from the one used to control the mass spectrometer and analyze the data results. It would be possible to run the expert overseer in a multi-tasking environment on the same computer used to operate the instrument. However, this latter alternative has at least two disadvantages: (1) the overseer would not really be independent from the dedicated application, and (2) the multi-tasking system would consume substantial computer resources.

In the preferred embodiment, the expert overseer would be run on a central computer located at a place remote from the mass spectrometer with only a terminal in the mass spectrometer laboratory. It would be best to have the overseer in a remote location so that a laboratory problem (a water leak, for example) would not shut down both systems. This approach would also make it easier to match the overseer computer to the demands of a particular application. Running the overseer as a sub-task on a central computer system could involve less overall computer hardware. A central system could be also used to run multiple copies of the program to oversee several different instruments.

FIGS. 2 through 10 provide the logical structures for five separate but closely coupled processes. These processes are: (1) the expert overseer process, (2) the user interface process, (3) the data collection process, (4) the interrupt handling process, and (5) the data handling process. These processes start concurrently when the master process begins.

The logic and control structure for the multiple tasks that operate under these processes are also provided in FIGS. 2 through 10. Variable names enclosed in brackets are global entities held in the common data space 90 of the master program 50. There are three primary sets of common variables names, "[XFlag]", "[XComm]", and "[XStat]", where "X" can be "U", "E", "N", etc. The "XFlag" and "FlagX" variables (IFlag, UFlag, FlagU, etc.) used in FIGS. 2 through 10 represent record structures. These records contain a boolean variable for the branch tests, an integer code to designate the flag type (clock or device interrupt, user entry, expert system software interrupt, other response activities), data array code (number of real values in the record), a data array (4 or 5 REAL number variables to hold the current data from a particular device), and a comment field (ASCII data). The [XFlag] variables are multi-part records with TRUE-FALSE (Boolean) flag, action code, device identifier, and pointer. The [XComm] variables are message packets with instructions or other facts to augment the [XFlag] record. The [XStat] "status" variables are simply TRUE-FALSE flags. Shared data is held in another common variable, [CData]. Other variable names are local to the various processes. These variables may be read and modified by selected processes. Table I shows the conditions under which these major global variables are transformed by the different processes.

At startup, four of the five processes (all but the interrupt handler) access the common data space 90 to read the current device configurations of the intelligent overseer and the instrument to which it is attached. During this period, the interrupt handler 110 invokes the hardware interrupt service routines. The flags in the common data space 90 form a mixture of pre-defined and immediately-read initial conditions. This startup sequence would also have instructions for an initial device survey protocol. After initialization, the five processes continue to run in parallel, exchanging information and instructions via the common data space 90.

Figure 2:
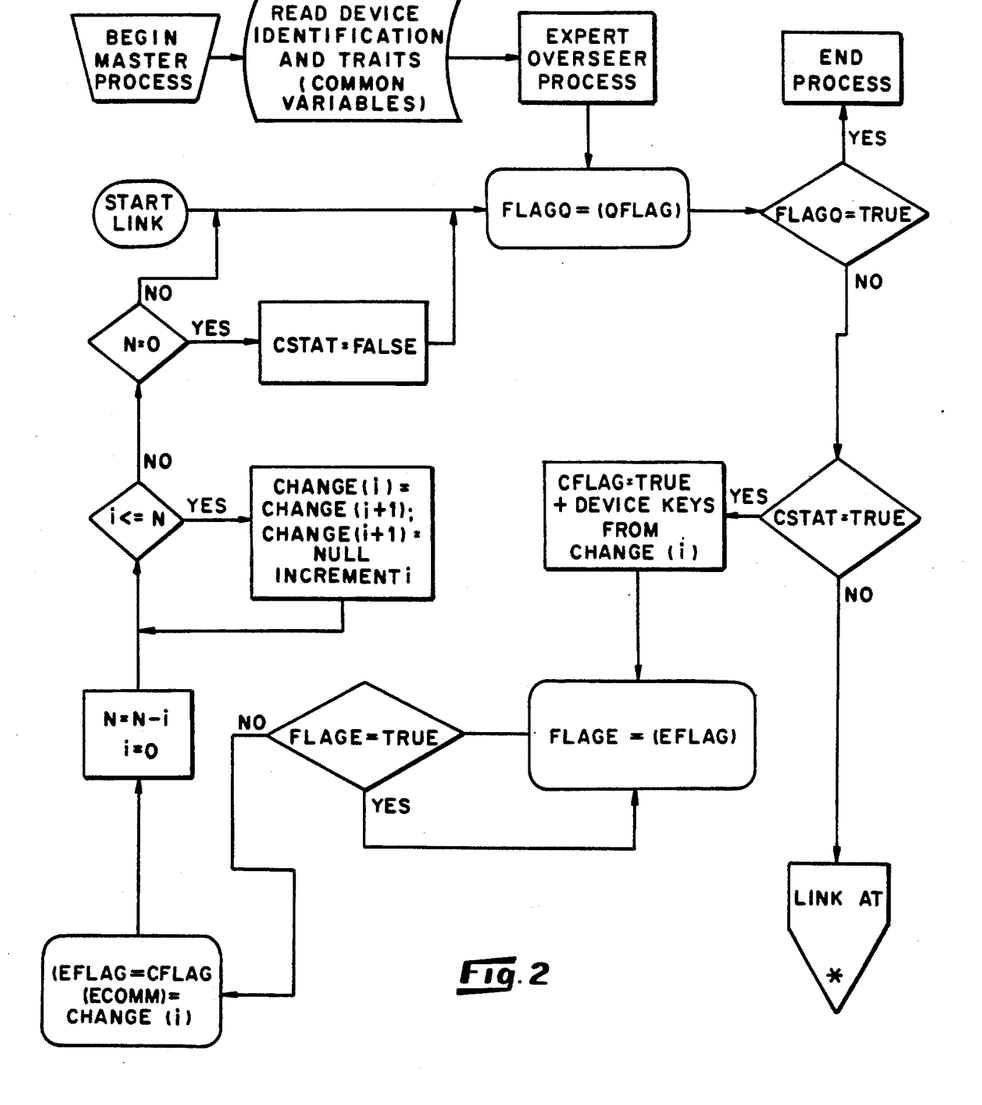
FIG. 2 is a chart of the logical structure of the expert process of the overseer.

Referring to FIG. 2, the expert system process cycles continually through a check of the [QFlag] value; only when this is set FALSE by the user/operator 80 or the expert system process 70 does the process shut down. The software then branches based on the value of "CStat," which is TRUE if the user process or a prior conclusion in the expert process requires a change in the device-query situation. If CStat is TRUE, the process writes the details of the new conditions into the common space message record, [EComm]. This occurs only when the interrupt handler has read the material previously stored in [EComm] ([EFlag] is FALSE). The expert process next sets [EFlag] to TRUE with a "change" action code, device identifier, and pointer into the "new" [EComm]. This cycle is repeated until each change has been written and read, at which time CStat becomes FALSE.

Figure 3:
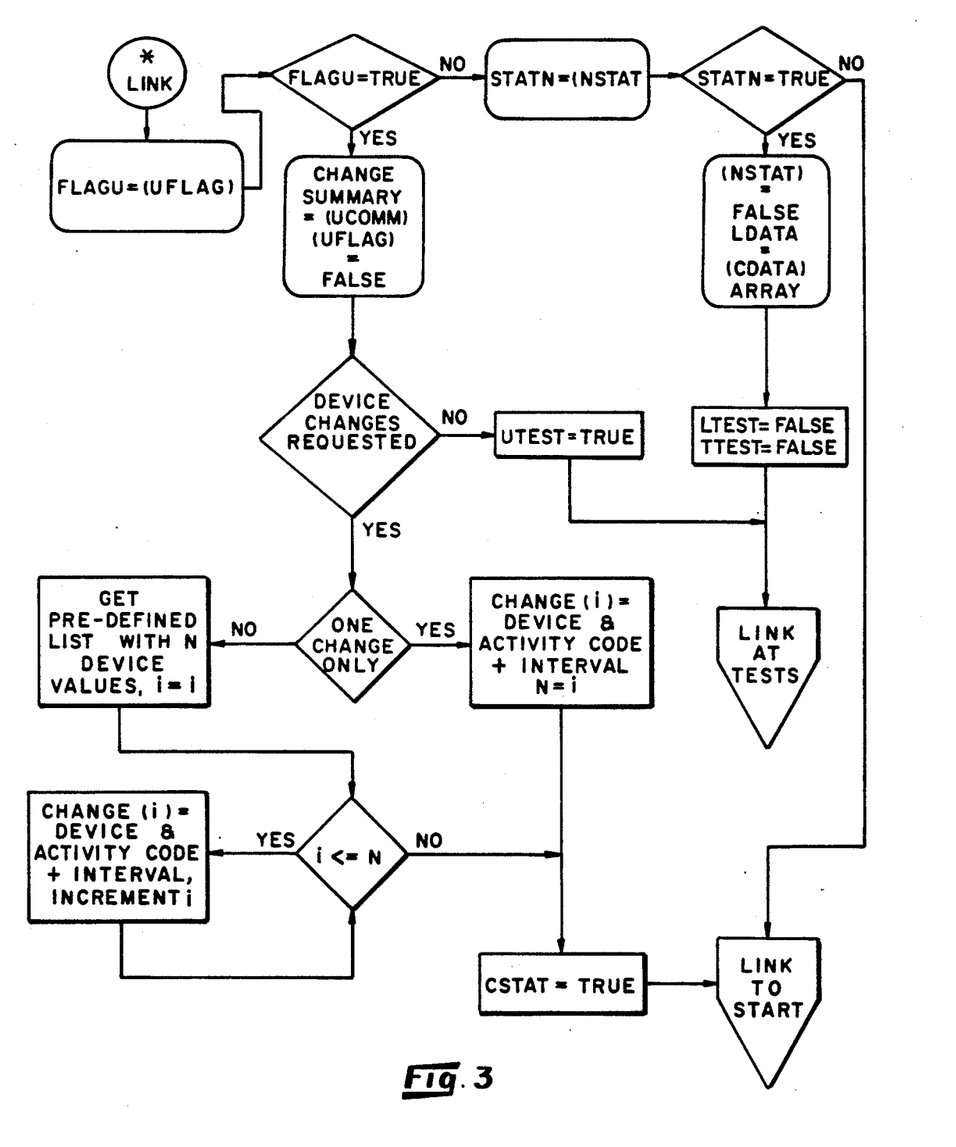
FIG. 3 is a continuation of the chart of the logical structure of the expert process of the overseer in FIG. 2.

If CStat is FALSE, the expert process branches to read [UFlag] at the top left of FIG. 3. The [UFlag] variable may be set to TRUE by the user interface process, or elsewhere in the expert process. If [UFlag] is TRUE, the process reads the information pointed to in the user communications variable, [UComm], and sets [UFlag] back to FALSE. The action code in [UFlag] can mark one of two possibilities: the presence of new device parameters or a test invocation. In the first case, details on the new parameters for a device or devices—including appropriate action codes, identifiers, special instructions, etc. —are copied from [UComm] into the local change list. When the list is complete, CStat is set TRUE, and the process returns to the top-level cycle described in the previous paragraph. A test invocation in [UFlag] sets the local variable "UTest" to TRUE and branches into the next chart.

IF [UFlag] was FALSE at the start of FIG. 3, the expert process checks the status flag [NStat] to see if any new data has been stored in [CData], the common data matrix. If [NStat] is TRUE, the expert process reads the new data, sets [NStat] to FALSE, and branches into the next chart. If not, the process returns to its top-level cycle (FIG. 2).

Figure 4:
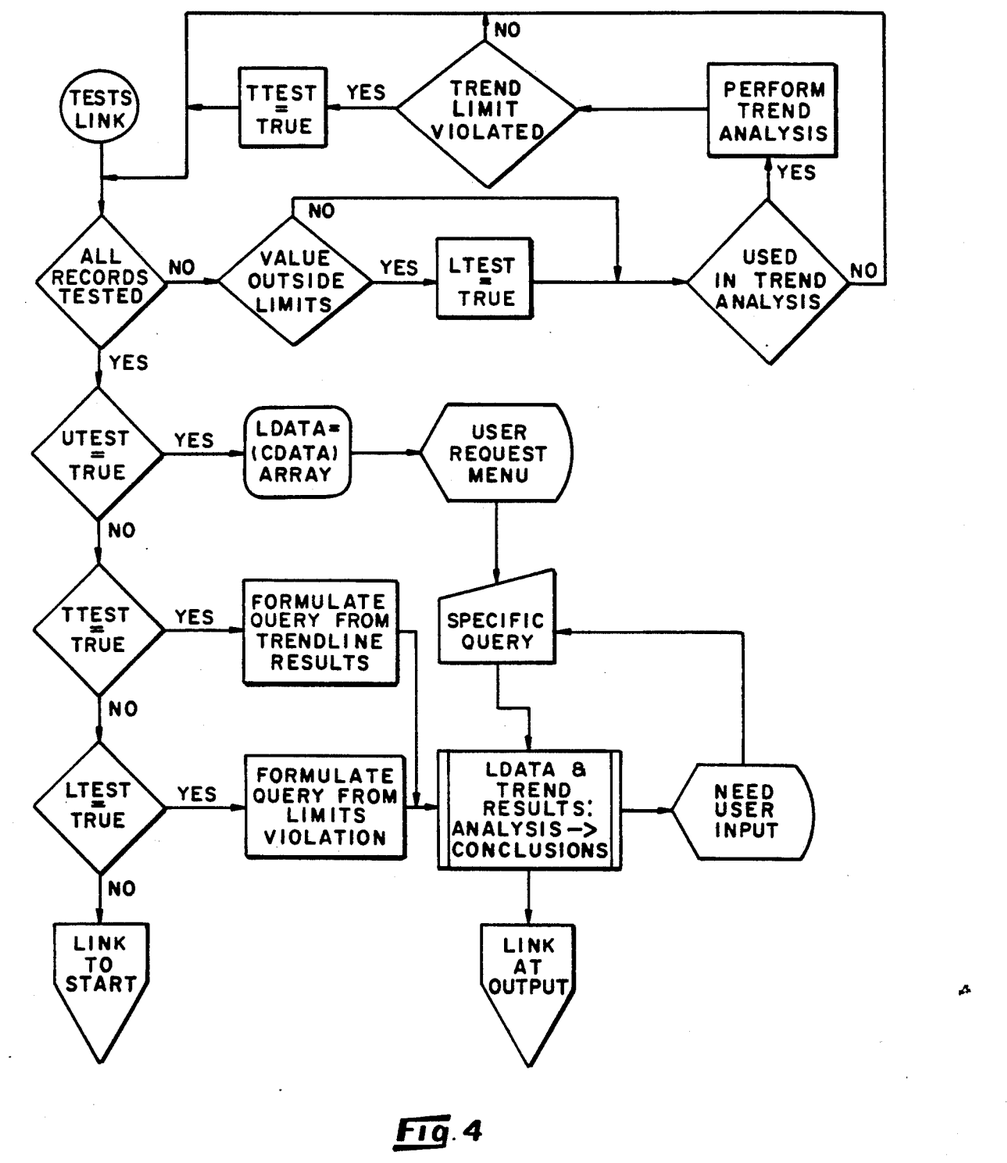
FIG. 4 is a further continuation of the chart of the logical structure of the expert process of the overseer in FIG. 2.

FIG. 4 shows several checks performed by the expert process: data trend analyses ("TTest" variable), limits tests (LTest), or a User-request (Utest) invocation. A user request instruction causes the process to read the current data array and ask for further input from the operator. If either of the other branches is TRUE, the process formulates a query strategy based on the information received. All three branches then pass into the expert system, which evaluates the situation versus its rule base. If there is no user request and none of the tests fail, the process returns to the top-level cycle involving CStat and [QFlag] as shown in FIG. 2.

One attribute of a knowledge-based expert system is that typical flow charting methods cannot readily show all the activities made possible by the rule base and inference engine. These operations are therefore summarized by the double-sided box in FIG. 4. Not only would this system accept user input, it would directly access the common data in [CData], and might well call up older historical data from mass memory. Under some circumstances, the rule base might trigger a system shutdown by directly setting the quit [QFlag] to TRUE.

Figure 5:
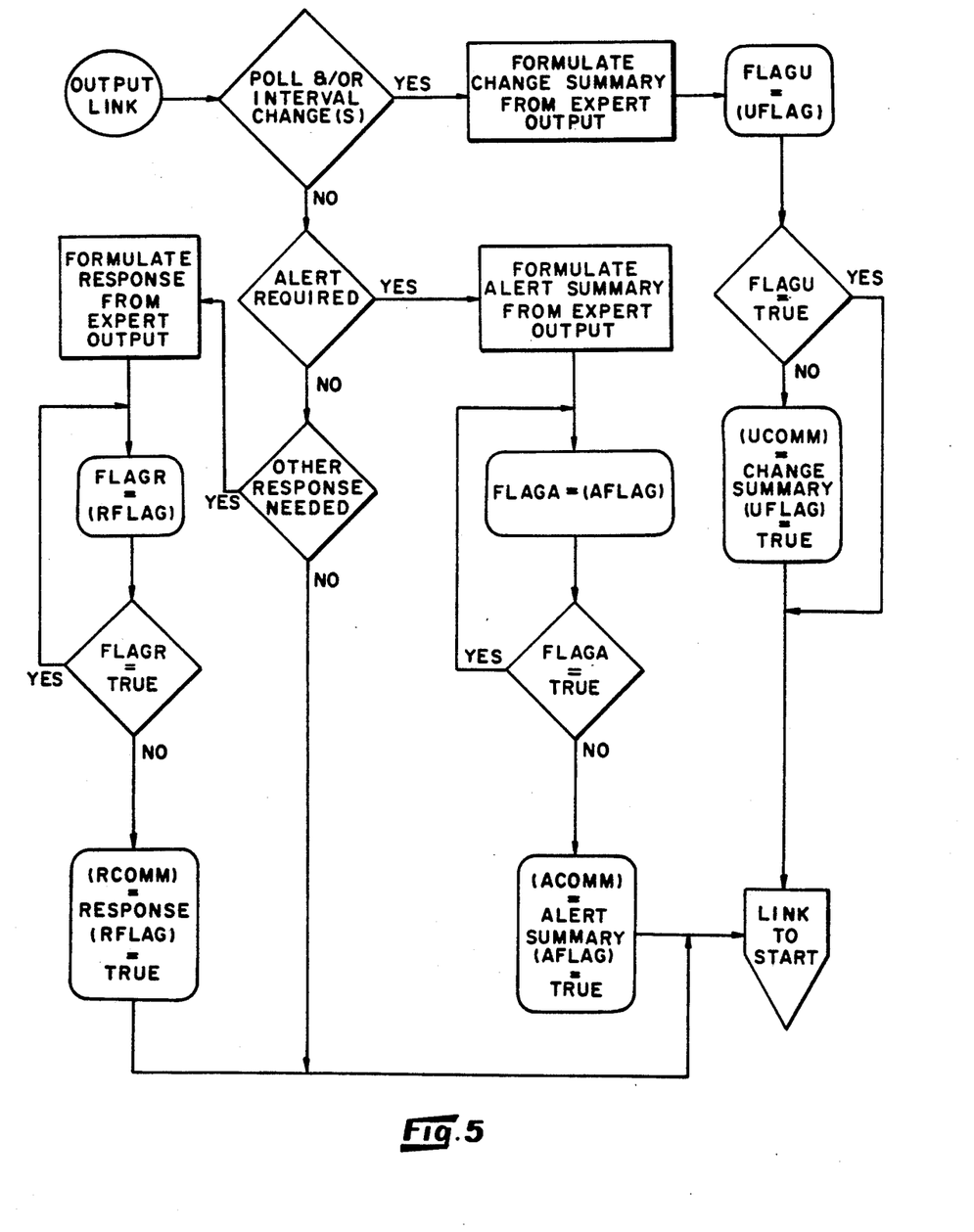
FIG. 5 is a still a further continuation of the chart of the logical structure of the expert process of the overseer in FIG. 2.

Conclusions reached by the expert system are passed along to the change summary sequence described in FIG. 5. There are four possible outcomes. First, new device polling parameters may be defined. If so, [UFlag] is set to TRUE with a parameter-change action code, and details are written to [UComm]. (This will in turn invoke the device parameter listing sequence shown in FIG. 3.) Second, the operator may need to know about a potential problem, so [AFlag]—the "Alert" flag—is set TRUE, and an alert summary is written to the communication variable [AComm]. Third, more information may be needed, so the "Response" [RFlag] is set TRUE with action code settings as required and a query message stored in [RComm]. In each case, the process waits until the pertinent flag is FALSE before the new information is written. The fourth option is that no action is required. All four routes finish by returning to the top-level cycle.

Figure 6:
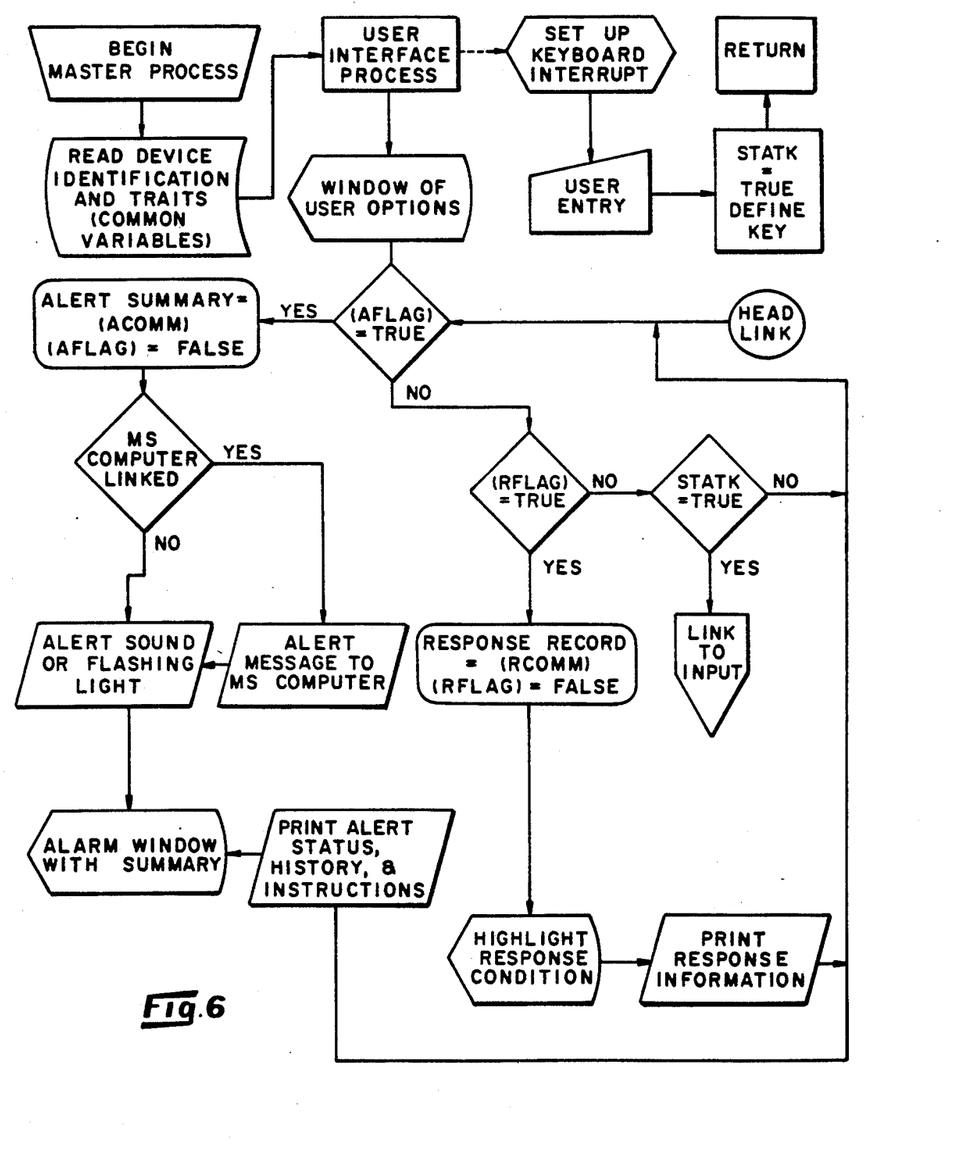
FIG. 6 is a chart of the logical structure of the user interface process of the overseer.

FIG. 6 shows that, in addition to the normal initialization procedure, the user interface process also invokes a keyboard interrupt subroutine. This capability is needed to get the attention of the computer while it is running the overseer cycle in real time. The process initialization also displays some general instructions on the computer monitor. After startup, the user interface process repetitively cycles through the [RFlag] (response), [AFlag] (alert) and "StatK" (keyboard interrupt) tests. This process takes no other action while these are FALSE.

If the response [RFlag] becomes TRUE, the interface process reads the related communication stored in [RComm] and describes (via the display and a printout) information about the situation that requires a response. Depending upon the situation, the action code in [RFlag] may invoke a "menu" of user input selections, with specific entries noted in [RComm]. The process then returns to its top-level cycle.

If the alert [AFlag] becomes TRUE, the Interface process reads the related communication stored in [AComm] and warns the operator about the actual or impending problem via a mix of displays, tones, lights, and printed messages. The display output may include a request for User input. As in other cases, the action code in [AFlag] will guide the mix of prompts and request items to be employed. Once all the necessary information has been displayed, the User process returns to the top-level cycle.

Figure 7:
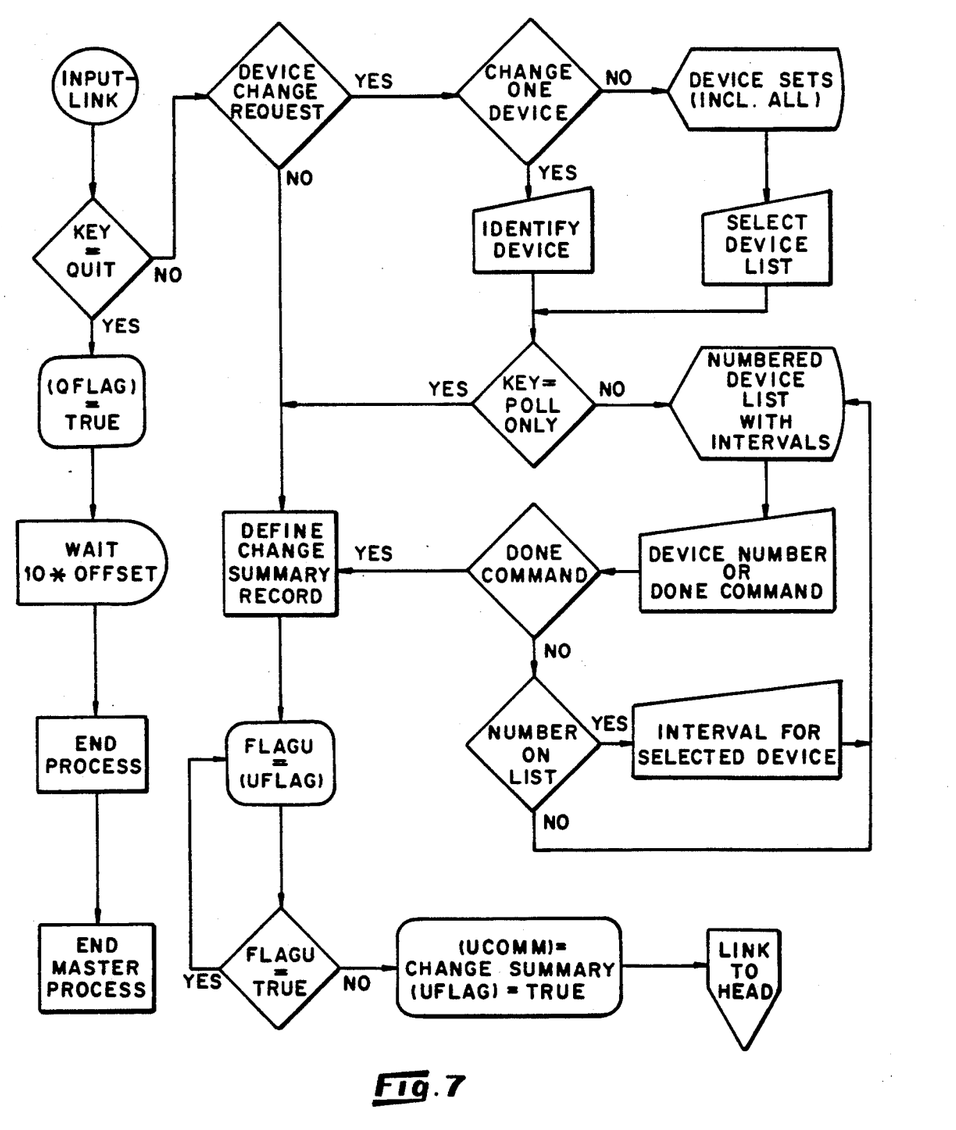
FIG. 7 is a continuation of FIG. 6, the chart of the logical structure of the user interface process of the overseer.

When the operator presses a key (the third top-level option), the User process branches into the input-examination code shown in FIG. 7. If the "quit" command was entered, the process sets the "Quit" [QFlag] to TRUE, waits a moment while the concurrent processes register the change, then shuts itself down, followed by a master process shutdown.

Another active input would be a request to change the device status setup. When such a request is made, a series of instructional menus is displayed. These menus allow the user to ask for an immediate one-time polling of one or more devices, or to change the polling intervals to be used from that point on. The final outcome from this side cycle will include a parameter-change action code in [UFlag] and a list of changes in [UComm]. The "No" branch from the "device change request" decision includes every other possible keyboard input: specific replies to response or alert queries, input to trigger actions by the expert process, etc. Once these entries are complete, the user interface process assures that [UFlag] is FALSE, meaning that the expert process is not actively working with it. The user process then writes the relevant details to [UComm], sets [UFlag] TRUE with an appropriate action code and returns to its top-level cycle (FIG. 6).

Figure 8:
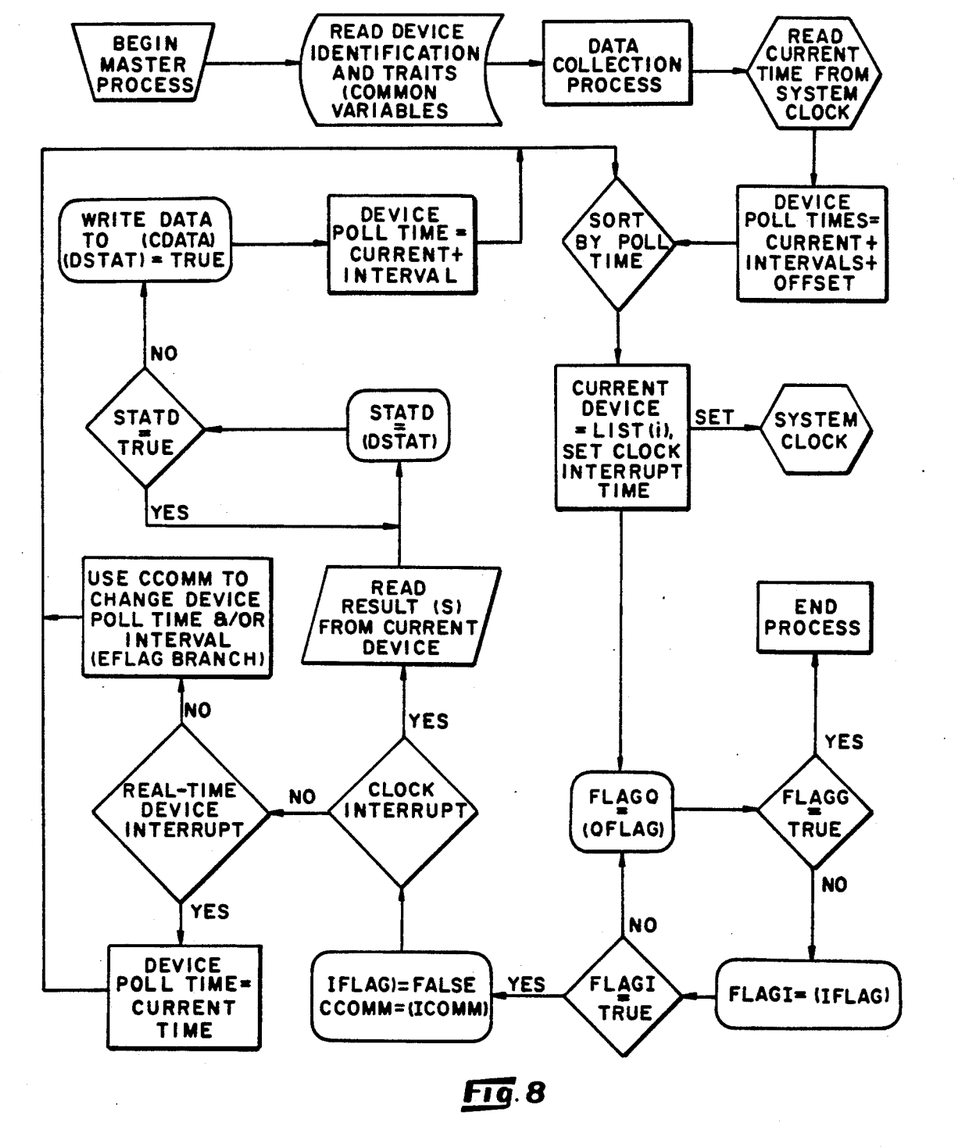
FIG. 8 is a chart of the logical structure of the data collection process of the overseer.

The data collection process shown in FIG. 8 has the usual initialization, but also includes a check of the system clock and calculation of the device polling times. These are sorted to define the sequence to be used, and the clock is instructed to return an interrupt after the sampling interval for the topmost item has passed. The process then goes into a cycle that repetitively checks [QFlag] for the "quit" directive, and the "interrupt" [IFlag] for the occurrence of a controlling event ([IFlag] becomes TRUE).

The first option is to have [IFlag] be TRUE, with an interrupt action code, and a system clock identifier. In this case, the data collection process knows that it is time for the planned sampling of the topmost item in the sorted polling list. The record for that item will show the device to be sampled, and any special directions. The process then reads that specific "current" device and stores the results in the local record StatD. Stored results include the device identifier (e.g, a certain thermocouple) a reading (a temperature), the time of the reading, and other pertinent information. When the common "Data Status" variable [DStat] is set to FALSE elsewhere by the data handler, the new results in StatD are appended to the common data list in [CData], [DStat] is set to TRUE, and a new poll time is derived for the device just sampled.

The second option is to have [IFlag] be TRUE, with an interrupt action code, and some device besides the clock identified. In this case, the data collection process knows that this is not a planned event. The process therefore sets the poll time for that device to the current time and returns to the sort code. Any special information about that device and how it is to be sampled are obtained from the [IComm] message indicated by the pointer in [IFlag]. Sorting now puts the intruding device first in the sampling list and tells the system clock to interrupt immediately for that input. The purpose of this sequence (rather than simply reading the intruding device directly) is to properly synchronize the activities of the interrupt Handling, data collection, and data handling processes.

The final option is to have [IFlag] be TRUE, with a parameter-change action code, and a specific device identifier. This means the event noted by [IFlag]is a command from the expert process, via [UFlag]and [EFlag]. Details related to the flagged situation are read from the common communications record, [IComm]. These directives serve to change the device polling times and/or intervals, and lead to a re-calculation of the values to be sorted for the active interrupt list. Once the new list has been prepared, the process returns to the [QFlag]-[IFlag] waiting cycle.

Figure 9:
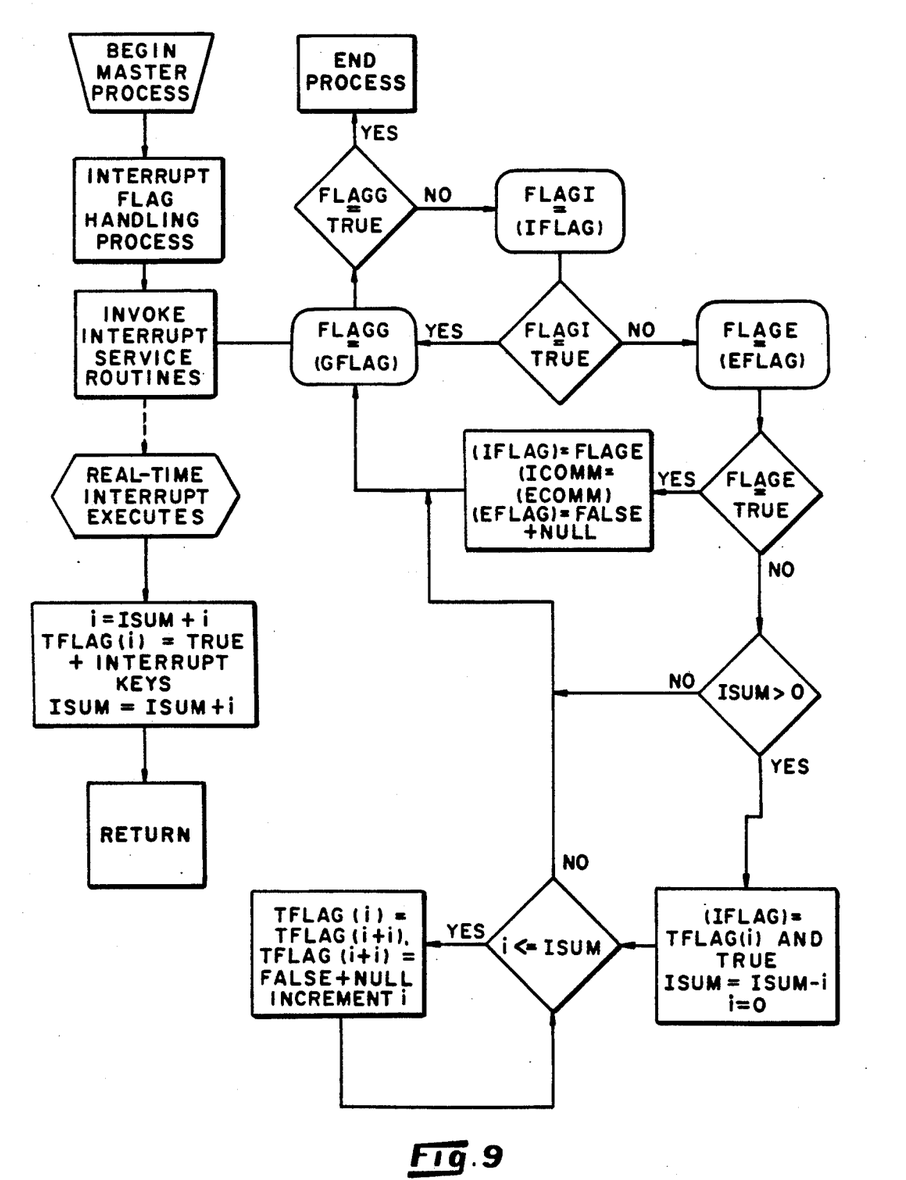
FIG. 9 is a chart of the logical structure of the interrupt handling process of the overseer.

The software part of the interrupt handling process is plotted in FIG. 9. Although the code is relatively simple, the actual hardware implementation can be quite complex because the devices run independently, and must provide unique identification markers. The handler startup sequence must initiate all of the necessary data buffers, hardware/software links, and other details of the implementation. Whenever possible, the system will be designed so the overseer sends only a trigger signal that would invoke a remote device control system. Internally, the handler also builds a stack to collect real-time interrupts as they occur and store key device identification data.

After initialization, the interrupt handling process repeatedly examines [QFlag] and [IFlag]. As before, setting [QFlag] to TRUE causes this process to shut down. Unless there is extremely heavy activity in the data collection process, the interrupt [IFlag] will be FALSE much of the time. While it is, the interrupt Handling process repeatedly checks [EFlag] for input from the expert process. If [EFlag] is TRUE, the interrupt handler checks the action code and device identifier and reads the communications placed in [EComm] by the expert process. The process then transfers the new device parameters to [IComm], sets [EFlag] FALSE and [IFlag] TRUE, and returns to its main cycle. (This will activate the interrupt-testing steps in the data collection process.) The interrupt handler also stores the current parameters for a given device for further reference. If [EFlag] is FALSE, the interrupt handler checks the interrupt stack in "ISum." If there is something in the ISum stack, [IFlag] is set to TRUE with an interrupt action code and relevant device identifier. Device parameters are also read from local storage and written to [IComm]. The process then returns to the main cycle.

Figure 10:
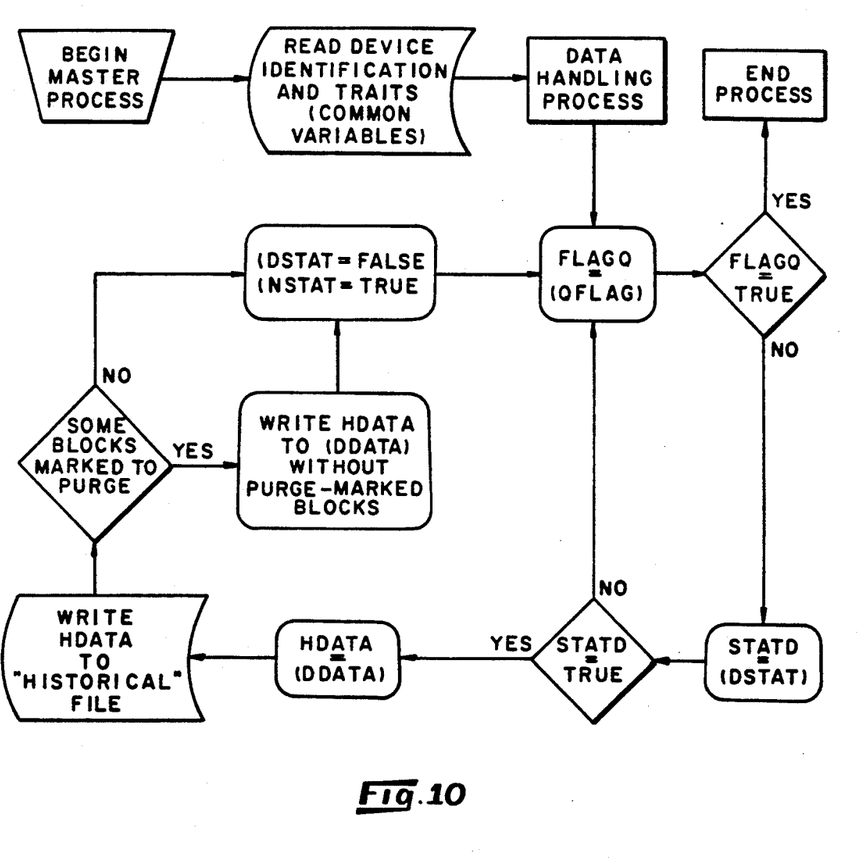
FIG. 10 is a chart of the logical structure of the data handling process of the overseer.

The data handling process is depicted in FIG. 10. After initialization, [QFlag] affords the usual shutdown control, while the data status variable [DStat] flags the addition of new information to the common data array [CData] by the data collection process. The data handling process saves the latest data to mass memory (magnetic tape or hard disk) as a historical file, and then checks for data blocks in [CData] that are marked as no longer being useful or appropriate. The marks would be set by rules in the knowledge based system in the expert process. The data handler would then purge the marked blocks from the active data file, but not from the historical record. After the purge test, the process sets [DStat] FALSE to allow for collection of more data, sets the new-data status flag [NStat] TRUE to note the addition for the expert process, and returns to the main cycle.

Figure 11:
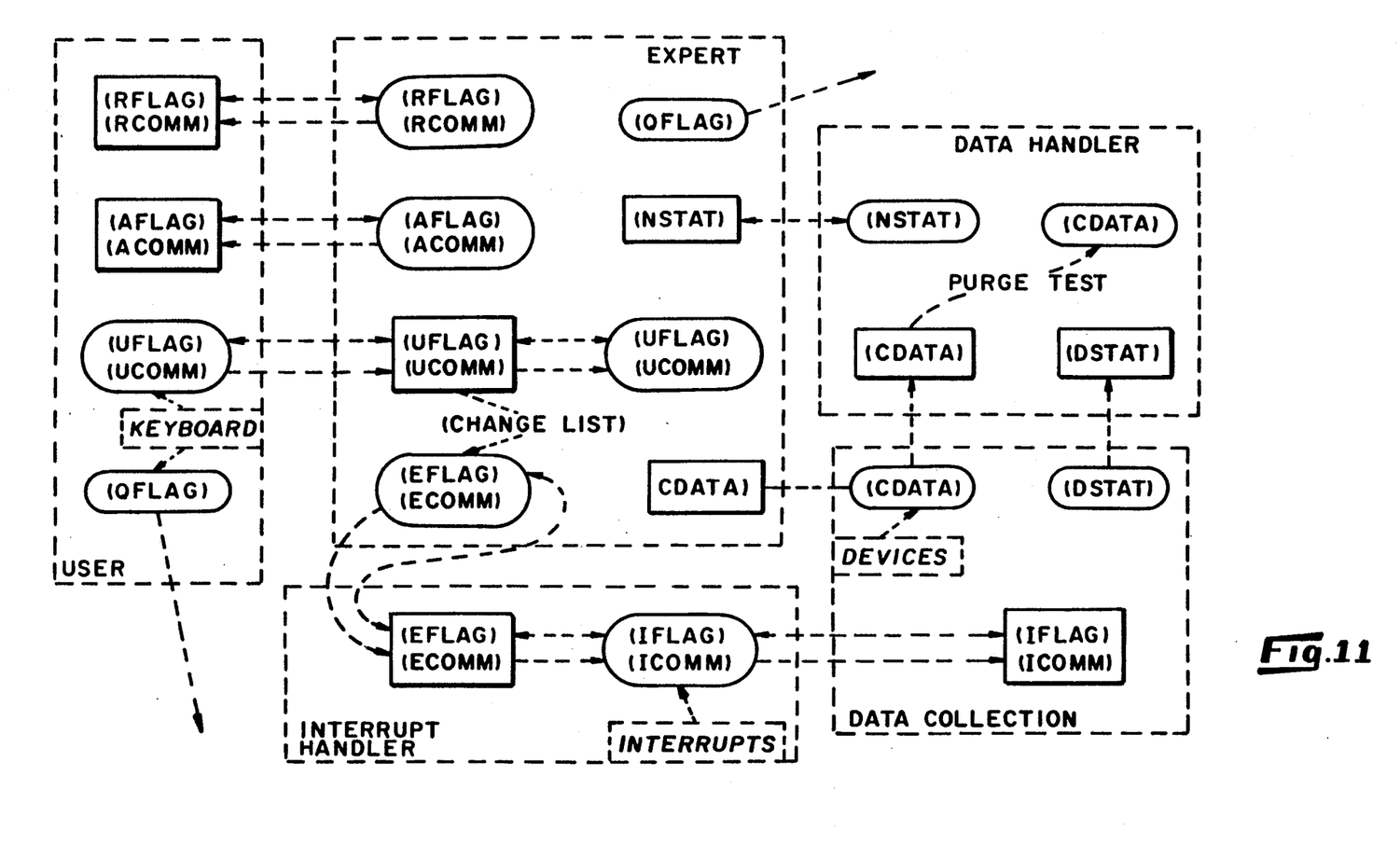
FIG. 11 is a chart combining the functions of the overseer.

FIG. 11 summarizes how the different variables used in the charts carry information from one process to another. Oval-enclosed names in FIG. 11 indicate that a common-space Boolean variable changes from FALSE to TRUE and a message and/or data is written to common space, while a box shows just the opposite. (If only a Boolean, or only a message/data type variable is present, then only the one change occurs.) The two-headed arrows refer to cyclic changes in the Booleans, while single-headed ones trace one-way information flows. In every case except for [QFlag], each [XFlag] variable flows in parallel with a message variable, [XComm].

As one example, trace a flow that starts with a device sampling request entered at the keyboard (User Interface area). IF [UFlag] is FALSE, the process writes the input into [UComm], with [UFlag] set TRUE. The expert process reads the [UComm] message and sets [UFlag] back to FALSE. The information is written via the local-variable change list into [EComm], with [EFlag] set TRUE. That in turn triggers an [EComm] read by the interrupt handler, which changes [EFlag] back to FALSE. The flow continues along to [IComm]. With [IFlag] TRUE, the data collection area decodes the device-sampling instruction, and —after a cycle through the clock interrupt—data is read from the device and written into [CData], with [DStat] set TRUE. New data is read by the data handler, transferred to mass memory and [NStat] is set TRUE. That in turn triggers the expert process trend analysis and other tests. Clearly, many other cycle and side routes are possible.

The embodiments of the invention in which an exclusive property or privilege is claimed are defined as follows:

1. An expert overseer system for the operation and real-time evaluation of a complex instrument system that includes key instrument components,
    a computer means capable of controlling the key instrument components and producing results from the complex instrument system, and
    a laboratory support system,
    said expert overseer system comprising:
    an interface coupling the key instrument components of the complex instrument system, the laboratory support system, and the computer means,
    a master overseer system comprising the computer means and a master overseer program implemented on the computer means,
    said master overseer system including a means for polling and collecting data from the key components of the complex instrument system, and the laboratory support system comprising automatically and manually specified time sequencing of said means for polling and collecting data,
    a knowledge base including data obtained from said means for polling and collecting data,
    heuristic rules and parametric rules responsive to the data obtained from said means for polling and collecting data, and set parameters,
    an expert means responsive to said means for polling and collecting data and said knowledge base, said expert means capable of using a rule base and an inference engine to automatically analyze the status of the complex instrument system, to employ a set parameter damage prevention system, and to potentially alter a specified sampling routine,
    an interrupt handling means responsive to the key instrument components of the complex instrument system and the laboratory support system, said interrupt handling means capable of initiating varying degrees of data collection by said means for polling and collecting data, and a user interface responsive to said expert means, said user interface capable of relating the output of said expert means to a human operator.

2. The expert overseer system of claim 1 in which said means for polling and collecting data is variable in frequency or sequence based upon inferences drawn by said expert means.

3. The expert overseer system of claim 2 in which said expert means is capable of initiating the shut down of the complex instrument system.

4. The expert overseer system of claim 3 in which said heuristic rules are flexible and time-related.

5. The expert overseer system of claim 4 in which said master overseer includes a common variable space for the exchange of data by said means for polling and collecting data, said expert means, said interrupt handling means, said user interface, and said knowledge base.

6. The expert overseer of claim 5 in which said expert means in self-diagnostic.

7. The expert overseer system of claim 6 in which the computer means includes a means for data storage and said master overseer program implemented on said computer means includes data handling means capable of sending data from said common variable space to said means for data storage and retrieving data from said means for data storage to said common variable space.

8. The expert system of claim 7 in which the computer means is multi-tasking and includes
a first tasking environment in which the computer means controls the complex instrument system, and
a second tasking environment in which the computer means implements said master overseer program.

9. The expert system of claim 8 in which the complex instrument system is a mass spectrometer system.

10. The expert overseer system of claim 1 in which said expert overseer system can employ data from said means for polling and collecting data and analysis from said rule base and said inference engine to determine if a significant condition is present and to use this information to modify said expert overseer system and to inform a user.

11. The expert overseer system of claim 1 in which said user interface allows a user to ask for further information from said expert overseer system and to provide instructions to said expert overseer system.

12. An expert overseer system for the operation and real-time evaluation of a mass spectrometer system that includes
a mass spectrometer having key instrument components,
first computer means capable of controlling the mass spectrometer, and
a laboratory support system,
said expert overseer system comprising;
a second computer means
an interface coupling the second computer means to the key components of the mass spectrometer, the laboratory supports system, and the first computer means,
a master overseer system comprising the second computer means and a master overseer program implemented on said second computer means, said master overseer system including
a means for polling and collecting data from the key components of the mass spectrometer and the laboratory support system comprising automatically and manually specified time sequencing of said means for polling and collecting data,
a knowledge base including data obtained from the means for polling and collecting data,
heuristic rules and parametric rules responsive to based upon the data obtained from the means for polling and collecting data, and
set parameters,
an expert means responsive to said means for polling and collecting data and said knowledge base, said expert means capable of using a rule base and an inference engine to automatically analyze the status of the complex instrument system, to employ a set parameter damage prevention system, and to alter a specified sample analysis,
an interrupt handling means responsive to the key instrument components of the mass spectrometer and the laboratory support system, said interrupt handling means capable of initiating varying degrees of data collection by said means for polling and collecting data, and
a user interface responsive to said expert means, said user interface capable of relating the output of said expert means to a human operator.

13. The expert overseer system of claim 12 in which said means for polling and collecting data is variable in frequency or sequence based upon the inference drawn by said expert means.

14. The expert overseer system of claim 13 in which said expert means is capable of initiating a shut down of the mass spectrometer system.

15. The expert overseer system of claim 14 in which said heuristic rules are flexible and time-related.

16. The expert overseer system of claim 15 in which said master overseer system includes a common variable space for the exchange of data by said means for polling and collecting data, said expert means, said interrupt handling means, said user interface, and said knowledge base.

17. The expert overseer of claim 16 in which said expert means is self-diagnostic.

18. The expert overseer system of claim 17 in which said second computer means includes a means for data storage and said master overseer program implemented on the second computer means includes a data handling means capable of sending data from said common variable space to said means for data storage and retrieving data from said means for data storage to said common variable space.

19. The expert overseer system of claim 12 in which said expert overseer system can employ data from said means for polling and collecting data and analysis from said rule base and said inference engine to determine if a significant condition is present and to use this information to modify said expert overseer system and to inform a user.

20. The expert overseer system of claim 12 in which said user interface allows a user to ask for further information from said expert overseer system and to provide instructions to said expert overseer system.

21. An expert overseer system for the operation and real-time evaluation of a complex instrument system that includes
key instrument components
a first computer means capable of controlling the key instrument components and producing analysis results from the complex instrument system, and a laboratory support system,
said expert overseer system comprising:
a second computer means,
an interface coupling said second computer means to the key instrument components, the laboratory support system, and the first computer means,
a master overseer system comprising the second computer means and a master overseer program implemented in said second computer means, said master overseer system including
a means for polling and collecting data from the key components of the complex instrument system, and the laboratory support system comprising automatically and manually specified time sequencing of said means for polling and collecting data,
a knowledge base including
data obtained from said means for polling and collecting data
heuristic rules and parametric rules responsive to the data obtained from said means for polling and collecting data, and set parameters,
an expert means responsive to said means for polling and said knowledge base, said expert means capable of using a rule base and an inference engine to automatically analyze the status of the complex instrument system, to employ a set parameter damage prevention system, and to potentially alter a specified sample routine,
an interrupt handling means responsive to the key instrument components of the complex instrument system and the laboratory support system, said interrupt handling means capable of initiating varying degrees of data collection by said means for polling and collecting data, and
a user interface responsive to said expert means, said user interface capable of relating the output of said expert means to a human operator.

22. The expert overseer system of claim 21 in which said expert overseer system can employ data from said means for polling and collecting data and analysis from said rule base and said inference engine to determine if a significant condition is present and to use this information to modify said expert overseer system and to inform a user.

23. The expert overseer system of claim 21 in which said user interface allows a user to ask for further information from said expert overseer system and to provide instructions to said expert overseer system.

* * * * *